May 28, 1946.  H. L. CUPPLES  2,401,053
MEASUREMENT OF SURFACE TENSION
Filed Oct. 9, 1945

Standard Liquid    Unknown Liquid

Inventor
HOMER L. CUPPLES

Attorney

Patented May 28, 1946

2,401,053

UNITED STATES PATENT OFFICE 2,401,053

MEASUREMENT OF SURFACE TENSION

Homer L. Cupples, Alexandria, Va., assignor to the United States of America, as represented by the Secretary of Agriculture Application October 9, 1945, Serial No. 621,392

3 Claims. (Cl. 73—53)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to means for determining the surface tension of liquids.

The method of determining surface tension by maximum bubble pressure is well known. According to the method, a gas bubble (normally air) is blown at the submerged end of a capillary tube dipped downwardly a known distance $h$ in the liquid being tested, the pressure of the gas in the bubble being measured. As the bubble grows to hemispherical shape and its radius of curvature diminishes, the pressure at first increases. When the bubble attains a certain size, further growth results in diminution of pressure. At this point the gas rushes into the bubble from the tube and the bubble breaks away from the end of the tube and rises to the surface.

If the bubble is small, its surface may be regarded as spherical. In this event, the maximum pressure occurs when the bubble is a hemisphere, the radius $r$ of which corresponds to the radius of the capillary tube. In the case of liquids which wet the tube moderately well, $r$ is the internal radius of the tube at its submerged end, since the liquid then covers the lower edge of the tube completely. If the liquid recedes to the outer edge of the tube, $r$ is taken as the outer radius of the tube.

P (dynes per sq. cm.), the maximum pressure in the bubble, is determined by measurement, which according to known procedure requires the use of delicate instruments and care in handling.

For sufficiently small bubbles, P is related to the surface tension $\gamma$ (dynes per cm.) of the liquid by the equation:

$$\gamma = \frac{r[P - gh(D-d)]}{2}$$

$gh(D-d)$ being the part of the pressure due to immersion of the end of the capillary tube in the liquid (i. e., the hydrostatic head), where $h$ (cm.) is the distance of the submerged end of the tube below the free surface of the liquid, $g$ (cm. per sec. per sec.) is the gravitational constant, $D$ (g. per cc.) is the density of the liquid, and $d$ (g. per cc.) is the density of the gas in the tube, and $r$ (cm.) being the radius of the tube, either internally or externally as the case requires.

In case of larger bubbles the surfaces of which may no longer be considered as spherical, it is necessary to correct for deviation from spherical form. This may be done by application of the table of correction factors calculated by Sugden (The Physics and Chemistry of Surfaces, by Neil Kensington Adams, 3rd ed., Oxford University Press, London, 1941, page 374).

The object of the present invention is to provide improved apparatus and procedure for determining surface tension of liquids, employing the above-described method of maximum bubble pressure.

The apparatus is illustrated in the accompanying drawing, in which

Figure 1:
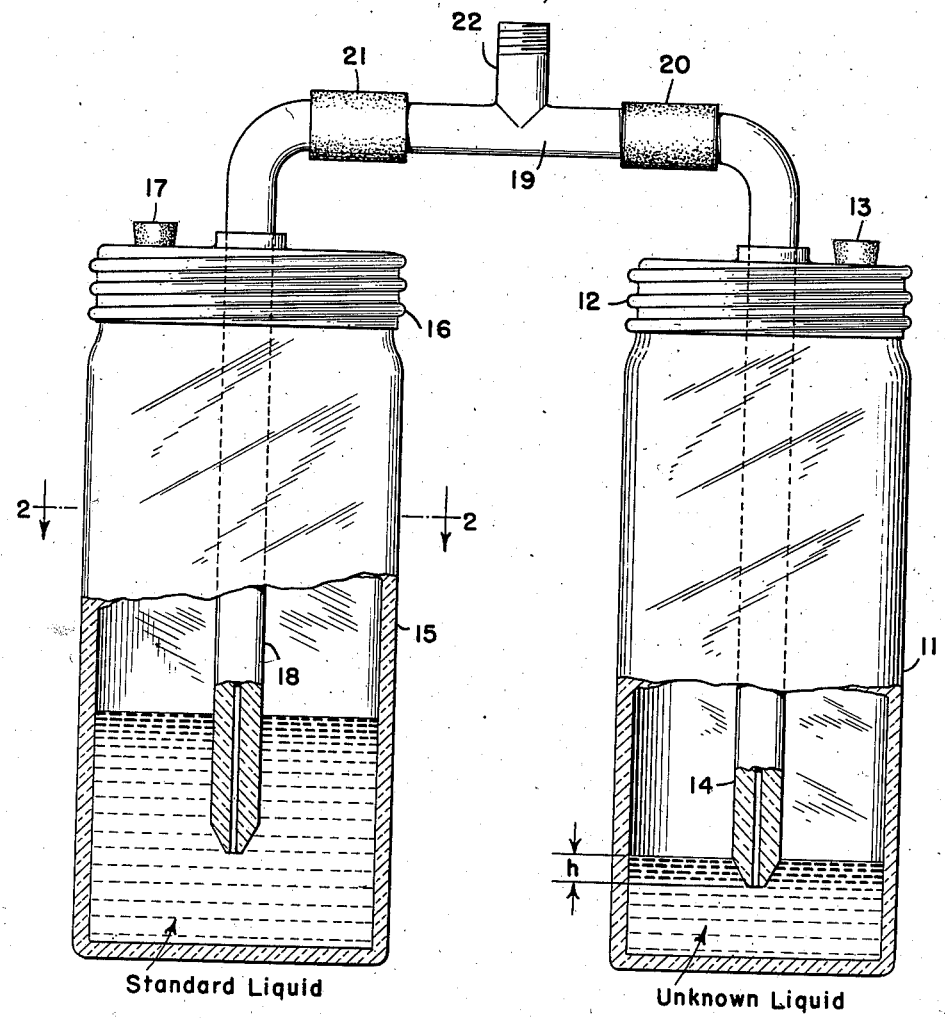
Figure 1 is an elevation with parts broken away.
Figure 2:
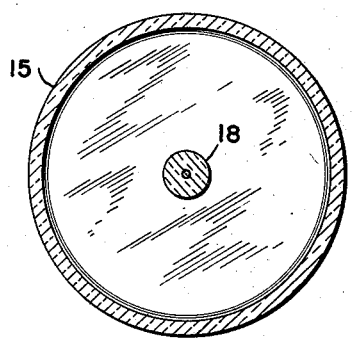
Figure 2 is a section on the line 2—2 of Figure 1.

The apparatus shown has a first vessel 11 for containing the unknown liquid to be tested. The vessel is closed at its top with a suitable cover or wall 12 provided with a filling aperture and stopper as at 13, which prevents excessive evaporation and gas diffusion and convection therefrom, and which permits the introduction and withdrawal of liquids from the vessel. The vessel is further provided with a capillary tube 14 extending downwardly therein and supported in a fixed position relative to the bottom and sides thereof and with the lower end of the tube a convenient distance from the bottom of the vessel. The lower end of the tube must be sufficiently distant from the bottom of the vessel not to interfere with blowing of bubbles from the submerged end of the tube.

A generally similar second vessel 15 for containing a standard liquid is provided with a cover or wall 16 having a filling aperture and stopper as at 17, and is also provided with a capillary tube 18 extending downwardly therein with the lower end of the tube sufficiently distant from the bottom of the vessel not to interfere with blowing of bubbles from the submerged end of the tube.

The vessels should be of such size that they may be conveniently weighed on the usual laboratory analytical balance. They are preferably constructed of transparent material, such as glass, and may be of any desired shape, but preferably with constant horizontal cross-sectional areas to facilitate calibration.

Although the dimensions are variable, the following are set forth as an example. Vessel 11 is 10 cm. high, has a square horizontal cross section, sides 4 cm., capillary tube 14 having an inner radius of 0.0424 cm. and extending 15 mm. from the bottom of the vessel. Vessel 15 is 10 cm. high, has a circular horizontal cross section, diameter 4.5 cm., capillary tube 18 having an inner radius of 0.0428 cm. and extending 13 mm. from the bottom of the vessel.

The tops of the tubes 14 and 18 extend out of the vessels, and means is provided for placing the tubes in communication with each other and in communication with a common source of gas pressure. As shown, a pipe 19 is connected between the outer ends of the capillary tubes with detachable connectors 20 and 21, pipe 19 being provided with a branch connection 22 for communicating with a source of compressed gas. Thus, when liquid is placed in the vessels to submerge the lower ends of the capillary tubes, admission of the gas will simultaneously tend to blow bubbles in the liquids, and the same pressure within each capillary tube will be obtained.

In using the apparatus for surface tension determinations, a known volume of the liquid to be tested may be placed in vessel 11, submerging the end of the capillary tube, vessel 11 having previously been calibrated with a liquid of generally similar capillary properties, so that the depth $h$ of submersion of the end is determined from the volume of liquid introduced. This calibration can be accomplished by trial using varied measured volumes of the liquid plotted against variations of $h$. The value of $h$ may be measured with a cathetometer. The volume of liquid introduced into the vessel either for calibration purposes or in use of the apparatus is expeditiously determined by weighing the vessel before and after introduction of the liquid to determine liquid weight and dividing this weight by the density of the liquid. It is not necessary, however, to have vessel 11 calibrated, since the value of $h$ may be determined by measurement at the time of making the surface tension determination.

A standard liquid such as distilled water or benzene, or preferably the special liquid later described, is placed in vessel 15, the vessel having been previously weighed, until the lower end of tube 18 is just submerged. Tubes 14 and 18 are then joined together through pipe 19 and the vessels are supported in a common water bath to regulate the temperature to 25° C., say, the temperature corresponding to that at which the apparatus is calibrated. A slow flow of gas, such as air, is then admitted through the branch 22, causing bubbles to emerge slowly from the submerged end of tube 18 (one bubble per ten seconds or slower recommended). More standard liquid is then very slowly added to vessel 15 to increase the gas pressure in the capillary tubes until the pressure is just sufficient to cause all the bubbles to emerge from the submerged end of capillary tube 14. At this stage, the common pressure in both capillary tubes will be the maximum bubble pressure P in the unknown liquid. Vessel 15 is then disconnected, its outer surface dried, and the weight taken. The difference between this weight and the weight of the vessel gives the weight of the standard liquid in the vessel, the volume being determined by dividing its weight by its density.

The volume thus determined is used as the factor for determining the pressure of the gas necessary to form the bubble on the end of tube 14. For this purpose, vessel 11 and its associated capillary tube must be previously calibrated. The calibration is accomplished by determining and plotting variations in the quantity, such as the volume, of standard liquid against the least pressures of the gas required to cause bubbles to emerge and break away from the submerged end of its capillary tube. Of course, the calibration may be in terms of the weight of the standard liquid rather than volume for convenience in using the apparatus.

Having thus determined the values of $h$ and the maximum pressure P, it is a simple matter to determine the surface tension of the unknown by the method of maximum bubble pressure set forth above.

As will be noted, after calibration the only apparatus required with liquids of known density according to the present invention are the simple jars, capillary tubes and the attachments as shown and described, and of course the usual laboratory balance for taking the weights. The procedure requires only weighing and comparison to densities to determine the volumes of the liquids in the vessels from which by reference to the calibration data for the two vessels the values of $h$ and P are obtained, or in case vessel 11 is calibrated in terms of weight of the standard liquid and $h$ is determined with a cathetometer comparison to densities to determine volume is unnecessary. All other factors except $\gamma$ being known, the value of $\gamma$ is readily calculated.

In addition to simplicity of the apparatus, it has been found that when carefully calibrated, the apparatus gives very accurate results, and can be used with greater facility and ease than with known types of apparatus.

It has been found that in use it is desirable to employ a standard liquid which is non-volatile and is not lost by entrainment in the gas stream bubbling through it, since losses by volatilization and entrainment cause fluctuation from the calibration of the vessel with consequent introduced error. It is also desirable that the standard liquid have a low surface tension so that low pressures may be measured with small capillary tubes.

From the standpoint of the above properties, distilled water is not as desirable as the special liquids described below.

These liquids are light grades of refined mineral oil having flash points over 315° F., fire points over 355° F., pour points not over 65° F., and viscosities, S. U., from 135 to 550 seconds at 100° F. or from 55 to 120 seconds at 210° F. These oils are relatively non-volatile and have surface tensions less than 65 dynes per cm. at 25° C. They have the further advantage in that they drain uniformly and with moderate rapidity from the walls of the vessel.

A particular oil has a gravity, A. P. I., 33.1, color, Robinson, 9½, a flash point about 415° F., a fire point about 470° F., a pour point about −20° F., a viscosity, S. U., about 236 seconds at 100° F. or 51.8 seconds at 210° F., a viscosity index 125, and a surface tension about 30.7 dynes per cm. at 25° C.

Having thus described the invention, what is claimed is:

1. An apparatus for determining the surface tension of an unknown liquid by the method of maximum bubble pressure, comprising a first vessel for containing the unknown liquid to be tested provided with a capillary tube, said tube extending downwardly in the vessel and supported in fixed position relative to the bottom and sides of the vessel with the lower end of the tube a convenient distance from the bottom of the vessel, a second vessel for containing a standard liquid provided with a capillary tube, said tube extending downwardly in the second vessel and supported in fixed position relative to the bottom and sides of the vessel with the lower end of the tube a convenient distance from the bottom of the vessel, said second vessel being calibrated by determining the least pressures required to cause bubbles to emerge and break away from the submerged end of its tube with variations in quantity of the standard liquid, and means for placing the tubes in communication with each other and with a common source of gas pressure.

2. The apparatus of claim 1 in combination with a standard liquid, said standard liquid being refined mineral oil having a flash point over 315° F., a fire point over 355° F., a pour point over 65° F., a viscosity, S. U., from 135 to 550 seconds at 100° F. or from 55 to 120 seconds at 210° F., and a surface tension less than 65 dynes per cm. at 25° C.

3. The apparatus of claim 1 in combination with a standard liquid, said standard liquid being refined mineral oil having a flash point about 415° F., a fire point about 470° F., a pour point about −20° C., a viscosity, S. U., about 236 seconds at 100° F. or 51.8 seconds at 210° F., and a surface tension about 30.7 dynes per cm. at 25° C.

HOMER L. CUPPLES.